United States Patent [19]

Cosenza et al.

[11] Patent Number: 4,805,288
[45] Date of Patent: Feb. 21, 1989

[54] METHOD FOR MAKING AND USING A LOCKING BEAM NUT

[75] Inventors: Frank J. Cosenza, Rolling Hills; Roy L. Warkentin, Lomita, both of Calif.

[73] Assignee: Rexnord Inc., Torrance, Calif.

[21] Appl. No.: 144,559

[22] Filed: Jan. 14, 1988

Related U.S. Application Data

[60] Division of Ser. No. 880,869, Jul. 1, 1986, which is a continuation of Ser. No. 644,417, Aug. 27, 1984, abandoned.

[51] Int. Cl.$^4$ .............................................. B23P 19/06
[52] U.S. Cl. .................. 29/426.5; 10/86 A; 10/155 R; 29/525.1
[58] Field of Search ............. 29/240, 426.1, 426.5, 29/426.6, 526 R; 10/1 B, 86 A, 86 C, 155 R; 411/280, 437, 937.1, 324

[56] References Cited

U.S. PATENT DOCUMENTS

| 118,238 | 8/1871 | Harvey . | |
|---|---|---|---|
| 426,185 | 4/1890 | Ibbotson . | |
| 584,158 | 6/1897 | Gordon . | |
| 655,118 | 7/1900 | Reis . | |
| 788,532 | 5/1905 | Higgin . | |
| 908,542 | 1/1909 | Broluska | 411/937.1 X |
| 993,371 | 5/1911 | Hines . | |
| 1,603,901 | 10/1926 | Brownlee | 411/937.1 X |
| 2,290,270 | 7/1942 | Brackett | 411/937.1 X |
| 2,294,058 | 8/1942 | Thompson . | |
| 2,299,085 | 10/1942 | Gade . | |
| 2,314,509 | 3/1943 | Olson . | |
| 2,316,684 | 4/1943 | Gade | 411/280 |
| 2,320,785 | 6/1943 | Luce | 411/937.1 X |
| 2,333,290 | 11/1943 | Brackett . | |
| 2,384,953 | 8/1943 | Miller . | |
| 2,393,520 | 1/1946 | Crowther . | |
| 2,401,672 | 6/1946 | Tinnerman | 411/437 |
| 2,410,995 | 11/1946 | Olson, Jr. . | |
| 3,142,325 | 7/1964 | Swanstrom . | |
| 3,441,073 | 4/1969 | Johnson . | |
| 3,687,182 | 8/1972 | Grimm | 411/280 |
| 3,702,628 | 11/1972 | Cosenza | 411/280 |
| 4,236,561 | 12/1980 | Monticelli | 411/280 |
| 4,408,363 | 10/1983 | Doree . | |

FOREIGN PATENT DOCUMENTS

| 455349 | 3/1949 | Canada | 411/280 |
|---|---|---|---|
| 12348 | 2/1881 | Fed. Rep. of Germany | 411/280 |
| 1802372 | 10/1967 | Fed. Rep. of Germany | 411/280 |
| 1811370 | 5/1968 | Fed. Rep. of Germany . | |
| 2055937 | 5/1972 | Fed. Rep. of Germany . | |
| 810417 | 12/1936 | France . | |
| 1025722 | 1/1953 | France | 411/437 |
| 1111508 | 11/1955 | France | 411/280 |
| 1480234 | 4/1967 | France . | |
| 2227780 | 1/1974 | France | 411/437 |
| 130874 | 5/1978 | German Democratic Rep. | 411/437 |
| 4911 | of 1883 | United Kingdom . | |
| 4597 | of 1886 | United Kingdom . | |
| 3654 | of 1889 | United Kingdom | 411/280 |
| 1649 | of 1903 | United Kingdom . | |
| 617597 | 2/1949 | United Kingdom | 411/280 |

OTHER PUBLICATIONS

EOP Search Report dated Dec. 5, 1985 for EPO Application Ser. No. 85630133.8.

Primary Examiner—E. Michael Combs
Attorney, Agent, or Firm—Pretty, Schroeder, Brueggemann & Clark

[57] ABSTRACT

A threaded locking beam nut 20 in which each of a plurality of beams 22 is configured such that confronting side walls 27 and 28 of adjacent beams diverge outwardly away from each other. Any debris located between that confronting side walls of adjacent beams thereof does not inhibit movement of the beams from a locking, expanding position to a free, inwardly-tapered position.

6 Claims, 2 Drawing Sheets

METHOD FOR MAKING AND USING A LOCKING BEAM NUT

CROSS-REFERENCE TO RELATED APPLICATION

This is a division of application Ser. No.: 06/880,869, filed July 1, 1986 and entitled "Locking Beam Nut," which is a continuation-in-part of application Ser. No. 06/644,417, filed Aug. 27, 1984, and entitled "Self-Cleaning Beam Nut", now abandoned.

BACKGROUND OF THE INVENTION

The present invention relates to lock nuts having a plurality of resilient locking segments which deflect in a manner similar to that of a beam, and, more particularly, to a construction of the locking segments such that the slotted area between adjacent locking segments is self-cleaning.

The present invention is an improvement in the design of the patented "LOCK NUT MEMBER" described in U.S. Pat. No. 3,702,628 which issued on Nov. 14, 1972 to Frank J. Cosenza. Subsequent to that invention it was determined that the performance of the lock nut, as well as other lock nuts of similar function, is affected by debris which accumulates in the slotted area between the opposing side walls of adjacent locking segments or beams, as they will hereinafter be referred to. Debris, e.g., oil, dirt, etc., which for a variety of reasons is found in the environment in which the lock nut is used, is extruded or removed from the interior of the lock nut by the threading action of the nut and bolt pushing the debris outwardly into the slotted areas between the locking beams. With the essentially parallel orientation of the opposing side walls of adjacent beams, the debris often remains within the slotted area unless physically removed by an outside force. Eventually the slot becomes filled and adversely affects the resilient nature of the locking beams. This situation is aggravated when the nut is used in a high temperature environment. Depending on the composition of the debris, high temperatures can cause the debris to harden and, as a result, force the beams to remain in an open position despite the removal of the bolt. High temperatures often are not necessary to cause this aggravated condition as a sufficient accumulation of debris particles forced into the slotted area will cause the beams to remain open. Accordingly, the beams lose their locking ability because the debris does not allow them to return fully to their natural locking position.

It has been found that physically cleaning each slot in the nut after disassembly of the fastener is not a practical solution of the industry and replacing clogged nuts is not desirable from a cost standpoint. The present invention provides a beam construction and arrangement which is self-cleaning and thus answers this particular need of the industry.

SUMMARY OF THE INVENTION

The invention is embodied in a locking beam nut having a plurality of circumferentially-spaced resilient locking beams that are specially configured to prevent any accumulated debris from preventing a desired deflection of the beams. The beams project from a substantially rigid body and a circular opening extends completely through the body and the locking beams. The beams all taper inwardly such that the circular opening they define has a uniformly-decreasing diameter. Continuous threads of substantially uniform depth are defined in the aligned openings, for receiving an externally threaded member, the locking beams thereupon resiliently deflecting outwardly to lock the member in place. In accordance with the invention, the confronting side walls of adjacent beams are configured to diverge outwardly from each other, such that any debris located between them cannot inhibit inward deflection of the beams upon removal of the externally threaded member.

In a first embodiment, the side walls of each beam are configured to be substantially parallel with the beam's direction of inward deflection. Each beam therefore slides along any debris located in the adjacent slots. In a second embodiment, the side walls are configured such that inward deflection of the beams squeezes the debris outwardly. In a third embodiment, the side walls are configured such that inward deflection of the beams actually moves the beams away from any debris.

All three embodiments can be modified to configure the beam side walls to include small portions parallel with the corresponding side wall portions of adjacent beams. These parallel side wall portions preferably extend no further than the depth of the threads in the beams' inner surfaces.

Other features and advantages of the present invention will be appreciated from the following description of the preferred embodiments, taken in conjunction with the accompanying drawings, which illustrate, by way of example, the principles of the invention.

DESCRIPTION OF THE PREFERRED EMBODIMENTS

Figure 1:
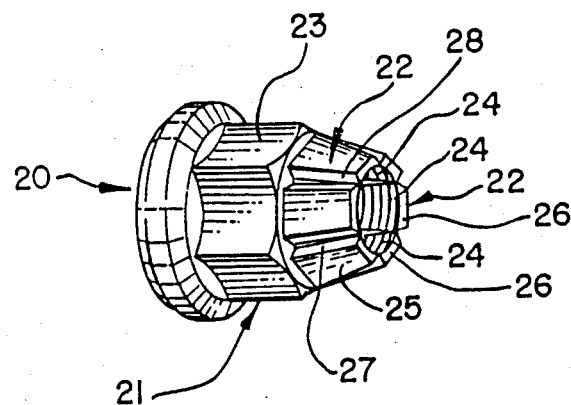
FIG. 1 is a perspective view of a locking beam nut embodying a first embodiment of the present invention.

In the drawings like reference numerals are used to indicate identical or like elements.

Figure 2:
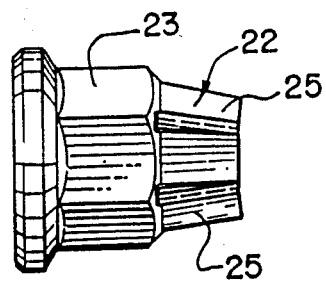
FIG. 2 is a side elevational view of the locking beam nut shown in FIG. 1.
Figure 3:
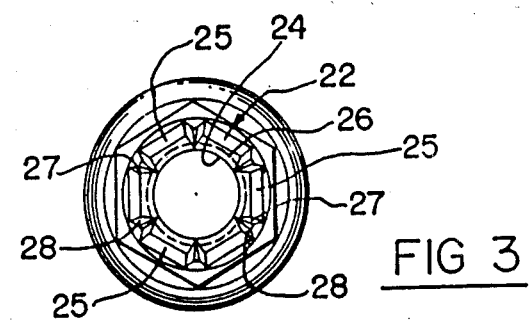
FIG. 3 is a top plan view of the locking beam nut shown in FIG. 2, with the locking beams being shown in their free, inward positions.
Figure 4:
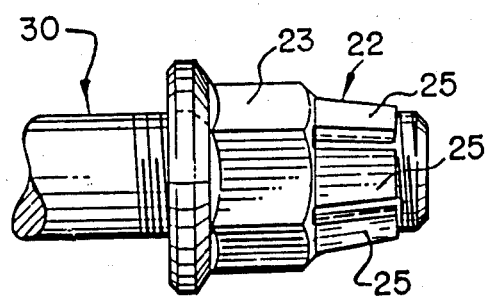
FIG. 4 is a side elevational view of the locking beam nut of FIG. 1, with a bolt locked therein.
Figure 5:
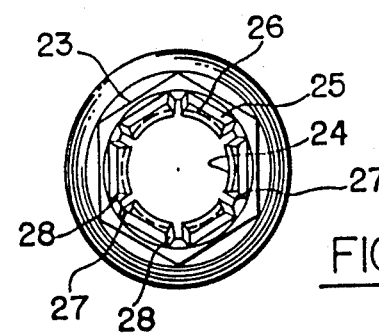
FIG. 5 is a top plan view of the locking bean nut of FIG. 4 with the bolt not being shown, but with the locking beams nevertheless being shown in their locking, outward positions.
Figure 6:
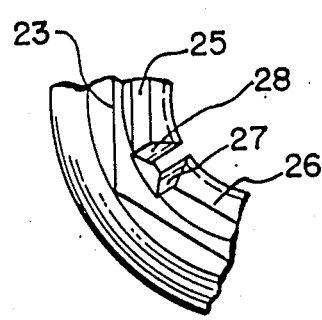
FIG. 6 is an enlarged view of a portion of the locking beam nut shown in FIG. 5.

The present invention is an improvement in the construction and operation of known locking beam nuts or lock nuts, and in particular of the lock nut shown and described in U.S. Pat. No. 3,702,628. Lock nuts of this kind are generally of a one-piece construction. Each lock nut 20 has a nondeflectible or rigid body portion 21 and a plurality of locking segments or beams 22. Each beam is formed integrally with the body portion 21 and extends axially therefrom, as can be seen in FIGS. 1, 2, and 4, which illustrate a first embodiment of the invention. The body portion 21 has an internal axial opening extending completely through it, as shown in FIG. 3. The opening is threaded so as to receive the external threads of a bolt or like part of a fastener. The body portion 21 may also have a plurality of wrench flats 23 along its external surface.

The lock nut 20 is depicted to include six locking beams 22. It should be understood, however, that the invention is not limited to any specific number of locking beams.

Each locking beam 22 has an inner surface 24 and an opposite, outer surface 25, which is preferably flat. A top surface 26, which is typically flat, extends between the inner and outer surfaces 24 and 25 and defines a free end of the beam. The plurality of locking beams 22 are arranged circumferentially at one end of the body portion 21 such that the inner surface 24 define a circular opening that is threaded and in communication, i.e., axially aligned, with the opening of the body portion 21. The threads in the aligned openings of the body portion and the beams extend along the entire axial length of the aligned openings, and have a substantially uniform depth around their entire circumference.

Each locking beam 22 also has a first side wall 27 and a second side wall 28. Each of these side walls extends between the body portion 21 and the beam's inner, outer and top surfaces 24, 25, and 26, respectively. Preferably, both side walls are smooth or flat.

In the first embodiment of the invention, depicted in FIGS. 1-8, the side walls 27 and 28 of each beam 22 are configured to be substantially perpendicular to the beam's outer surface 25. The confronting side walls of adjacent beams therefore diverge from each other, with increasing radial distance, forming an angle A. When the lock nut 20 includes six beams, as in the first embodiment, the side walls diverge at about a 60-degree angle.

To manufacture the lock nuts 20 embodying the present invention, known methods of machining and heading the nuts may be used to form the body portion 21 as well as the plurality of beams 22. It is believed no special tools or any modification of conventional machines is required to form the nuts as described in this application.

Figure 7:
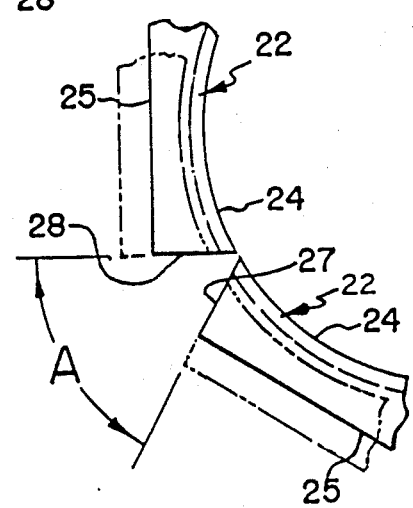
FIG. 7 is an enlarged, fragmentary view of a portion of what is shown in FIG. 3, and depicting in phantom lines the relative positions of two beams when a bolt member is located within the nut.

FIGS. 1-3 depict the lock nut 20 as it appears in a free state, prior to the insertion of an externally threaded member or bolt 30. It can be seen that the innermost portions of the beam side walls 27 and 28 are closely situated to adjacent beam side walls. As a bolt 30 is threaded into the lock nut and secured therein, as shown in FIG. 4, the beams deflect outwardly in the manner shown in FIG. 5. Upon removal of the bolt, each of the beams returns to its free state by flexing inwardly. The movement of the beams between a free state is schematically illustrated in FIG. 7. In the expanded or locking state, the beams are illustrated by phantom or broken lines.

The outward and inward deflecting movement of each beam 22 is along a radial axis substantially perpendicular to the beam's outer surface 25. This axis is substantially parallel with the side walls 27 and 28. Any debris located in the slot between the confronting side walls of adjacent beams therefore will not impede inward deflection of the beams, when the bolt 30 is removed. Accordingly, the lock nut configuration eliminates the problem of accumulated debris being compacted between the confronting side walls and inhibiting a return of the beams to their free, inward positions.

Figure 8:
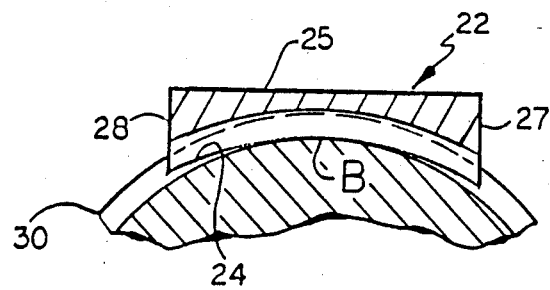
FIG. 8 is a top plan view of one beam of the locking beam nut, depicting the different radii of curvature of the beam and the bolt.

FIG. 8 is an enlarged plan view of a single beam 22 in association with the bolt 30. It will be observed that the radius of curvature of the beam's inner surface 24 is slightly greater than that of the bolt. This ensures that the surface and the bolt are tangent to each other only at a midpoint B of the beam, midway between the beam's side walls 27 and 28. The inner surface 24 and the bolt are spaced slightly away from each other at locations nearer the beam's side walls. The threads of the beam and bolt therefore cannot cut into each other and impede relative rotation.

Figure 9:
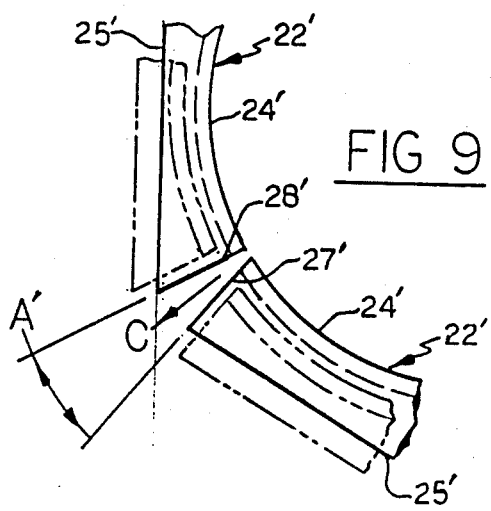
FIG. 9 is a fragmentary top plan view similar to FIG. 7, but of a second embodiment of the invention, in which the confronting side walls of adjacent beams diverge from each other by a lesser amount.

FIG. 9 is a fragmentary top plan view similar to FIG. 7, but of a second embodiment of the invention, in which the side walls 27' and 28' of each beam 22' are configured to form a slightly acute angle with the outer surface 25'. The specific angle is selected such that the confronting side walls of adjacent beams still diverge from each other, as indicated by the angle A', but by an amount less than that of the first embodiment (FIGS. 1-8). In this second embodiment, when the bolt (not shown) is removed, inward deflection of the beams causes their sidewalls to angle toward each other and, in doing so, squeeze outwardly any debris (not shown) located between them. The outward force imparted by the inwardly-deflecting beams is indicated by the reference letter C. In the depicted embodiment, which includes six beams, the angle between each side wall and its corresponding outer surface is selected to be between a minimum of sixty degrees (60°) and a maximum of ninety degrees (90°).

Figure 10:
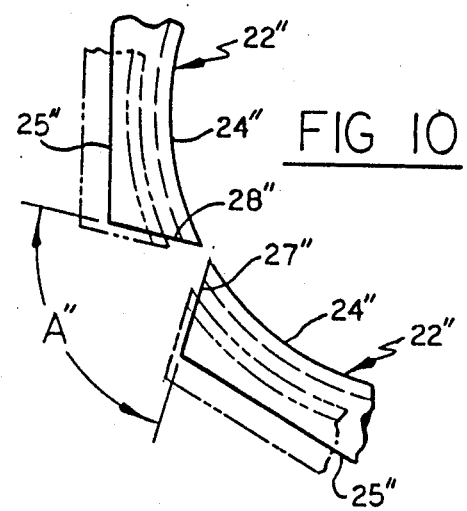
FIG. 10 is a fragmentary top plan view similar to FIG. 7, but of a third embodiment of the invention, in which the confronting side walls of adjacent beams diverge from each other by a greater amount.

FIG. 10 is a fragmentary top plan view similar to FIGS. 7 and 9, but of a third embodiment of the invention. In this third embodiment, the side walls 27" and 28" of each beam 22" are configured to form a slightly obtuse angle with the outer surface 25". The angle A" between the confronting side walls 27", 28" of adjacent beams is therefore greater than sixty degrees (60°) in the depicted embodiment. Inward deflection of the side walls, upon removal of the bolt (not shown), therefore causes the side walls to move away from any debris (not shown) located between them. Such debris therefore offers substantially no resistance at all to such movement. Any obtuse angle between a side wall and the outer surface of each beam should satisfactorily eliminate the undesired effect of the debris. However, unduly increasing the angle above ninety degrees (90°) could begin to affect adversely the resilience of the beams.

Figure 11:
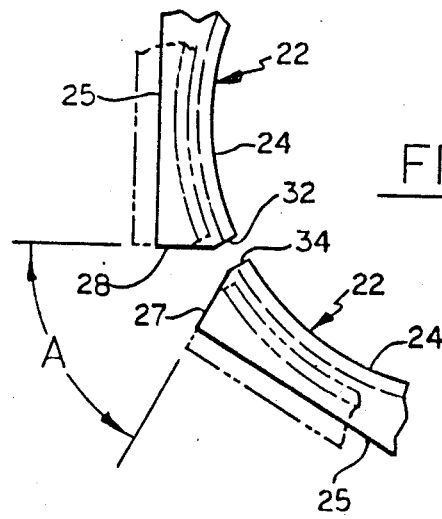
FIG. 11 is a fragmentary top plan view similar to FIG. 7, but of a modified version of the first embodiment of the invention, in which small portions of the side walls of each beam are configured to be parallel with the corresponding side wall portions of adjacent beams.

Any of the first three embodiments of FIGS. 1-7, 9 and 10, respectively, can be modified such that small portions of the side walls 27 and 28 of each beam 22 are arranged to be substantially parallel with the corresponding side wall portions of adjacent beams. This modification is depicted in FIG. 11, with the parallel side wall portions being identified by the reference numerals 32 and 34. It should be noted that these parallel side wall portions extend over a relatively short distance, corresponding roughly to the depth of the threads in the inner surfaces 24 of the beams. The presence of the threads ensures that the side wall portions will provide only minimal resistance to inward deflection of the beams.

It should be appreciated from the foregoing description that the present invention provides a lock nut having deflectable beams that are specially configured to prevent debris located in slots between the beams from inhibiting inward deflection of the beams from a locking position to a free position. In all of the disclosed embodiments, the confronting side walls of adjacent beams are configured to diverge outwardly away from each other. The debris therefore either has substantially no effect at all on inward deflection of the beams or is squeezed radially outward in response to such inward deflection.

Although the invention has been described in detail with reference to the presently preferred embodiments, those of ordinary skill in the art will appreciate that various modifications can be made without departing from the invention. Accordingly, the invention is defined only by the following claims.

What is claimed is:

1. A method for repeatedly fastening an externally threaded member to a locking beam nut, the nut being securely fastened to the member following each repeated fastening, the method comprising steps of:

providing a locking beam nut having a substantially rigid body, with a circular opening extending through it, and a plurality of resilient, circumferentially-spaced locking beams projecting generally axially away from one end of the rigid body, wherein the locking beams have inner surfaces that define a circular opening aligned with the circular opening in the body, wherein the locking beams taper radially inwardly such that the circular opening they define has a uniformly-decreasing diameter, and wherein the step of providing includes steps of forming threads in the aligned circular openings of the rigid body and plurality of locking beams, for receiving an externally threaded member, and configuring the plurality of locking beams to each have side walls arranged in spaced, confronting relationship with the side walls of circumferentially-adjacent locking beams, wherein each locking beam and its side walls are radially continuous, substantially planar, and free of any debris-retaining cavities from the beam's inner threaded surface to the beam's outer surface, and wherein the side walls of each pair of confronting side walls diverge from each other in a direction of increasing radial distance;

threading an externally threaded member into the locking beam nut, the locking beams resiliently flexing radially outwardly to lock the member in place;

exposing the locking beam nut to an environment where debris can enter the spaces between the confronting side walls of adjacent locking beams and harden in place;

unthreading the externally threaded member from the locking beam nut, the locking beams being configured in the step of providing such that they resiliently return to their unflexed locations despite the presence of hardened debris in the spaces between the confronting side walls of adjacent beams; and repeating the step of threading an externally threaded member into the locking beam nut, the locking beams again flexing radially outwardly to lock the member in place.

2. A method as defined in claim 1, wherein:
the threads formed in the step of forming are continuous and uninterrupted along the axial length of the aligned circular openings of the rigid body and plurality of locking beams.

3. A method as defined in claim 1, wherein the side walls of each of the plurality of locking beams, configured in the step of configuring, are substantially planar and parallel with each other and with the direction of the beam's radial deflection.

4. A method as defined in claim 1, wherein the side walls of each of the plurality of locking beams, configured in the step of configuring, are substantially planar and converge toward each other with increasing radial distance.

5. A method as defined in claim 1, wherein the side walls of each of the plurality of locking beams, configured in the step of configuring, include portions configured to be substantially parallel with corresponding portions of the confronting side walls of adjacent beams, the portions extending radially a distance substantially equal to the depth of the beams's threads.

6. A method for repeatedly fastening an externally threaded member to a locking beam nut, the nut being securely fastened to the member following each repeated fastening, the method comprising steps of:

threading an externally member into a locking beam nut having a substantially rigid body, with a circular opening extending through it, and further having a plurality of resilient, circumferentially-spaced locking beams projecting generally axially away from one end of the rigid body, wherein the locking beams have inner surfaces that define a circular opening aligned with the circular opening in the body, wherein the locking beams taper radially inwardly, when flexed, such that the circular opening they define has a uniformly-decreasing diameter, wherein the aligned circular openings in the rigid body and plurality of locking beams together contain threads for receiving the externally threaded member, the locking beams resiliently flexing radially outwardly to lock the member in place, and wherein the plurality of locking beams each have side walls arranged in spaced, confronting relationship with the side walls of circumferentially-adjacent locking beams, wherein locking beam and its side walls are radially continuous, substantially planar, and free of any debris-retaining cavities from the beam's inner threaded surface to the beam's outer surface and wherein the side walls of each pair of confronting side walls diverge from each other in a direction of increasing radial distance;

exposing the locking beam nut to an environment where debris can enter the spaces between the confronting side walls of adjacent locking beams and harden in place;

flexing the locking beams radially inwardly back to their unflexed positions by unthreading the externally threaded member from the locking beam nut, such that any hardened debris in the spaces between the confronting side walls of adjacent beams is moved radially outwardly relative to the locking beams; and repeating the steps of threading an externally threaded member into the locking beam nut, the locking beams again flexing radially outwardly to lock the member in place.

* * * * *